Nov. 7, 1944.  O. E. E. STROMBERG  2,362,324
BRAKE FOR TRAILERS AND THE LIKE
Filed Nov. 12, 1942  3 Sheets-Sheet 1

Inventor
Olof E. E. Stromberg
by Parker & Carter
Attorneys

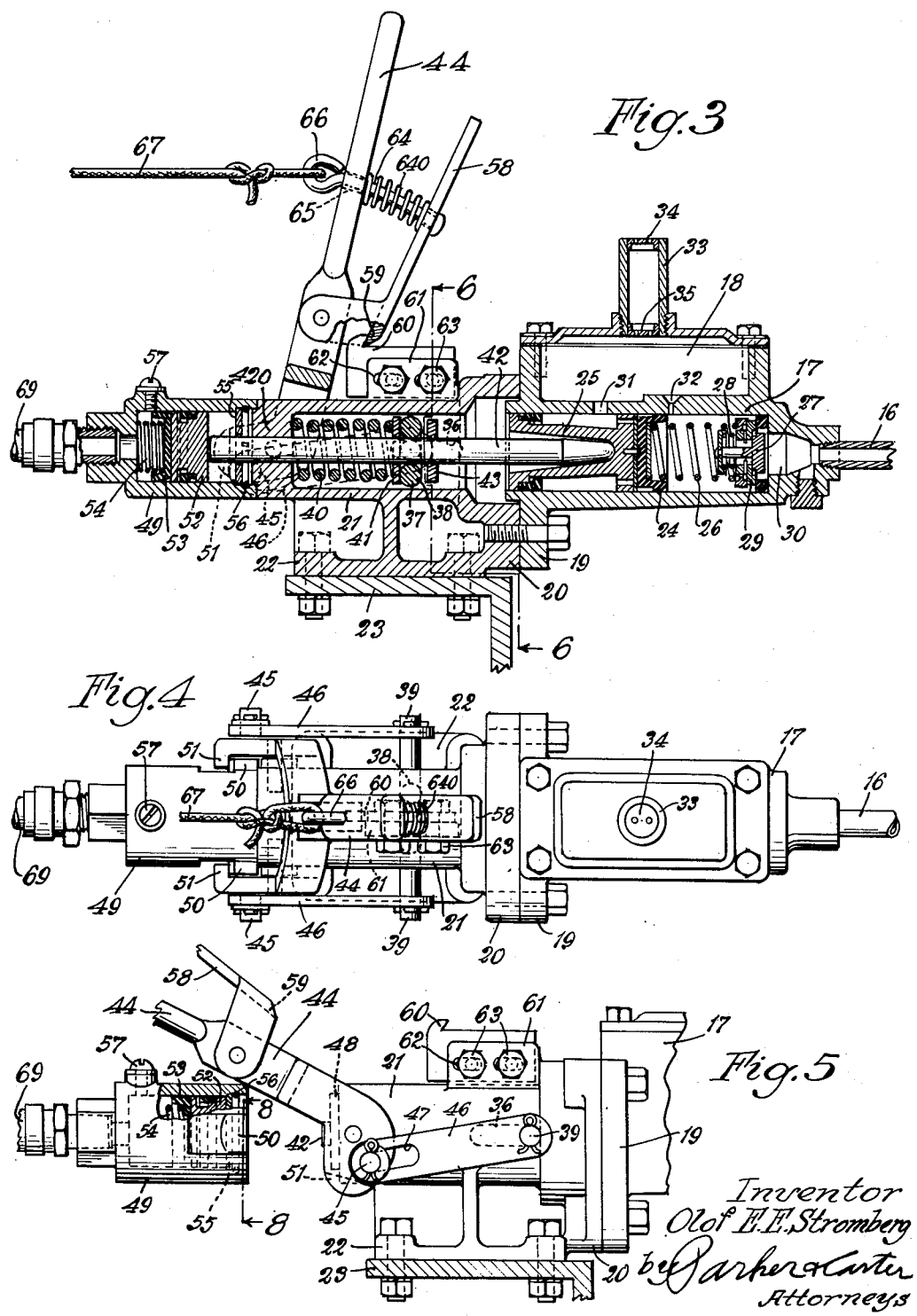

Nov. 7, 1944.   O. E. E. STROMBERG   2,362,324
BRAKE FOR TRAILERS AND THE LIKE
Filed Nov. 12, 1942   3 Sheets-Sheet 3
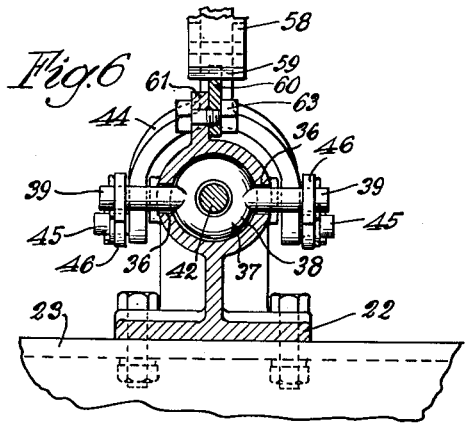
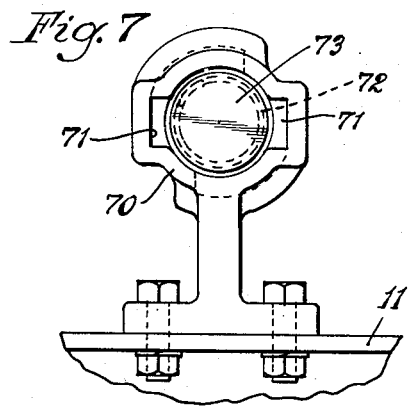
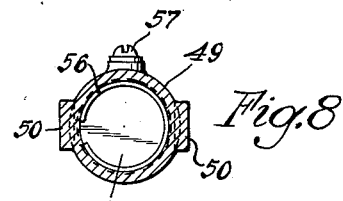
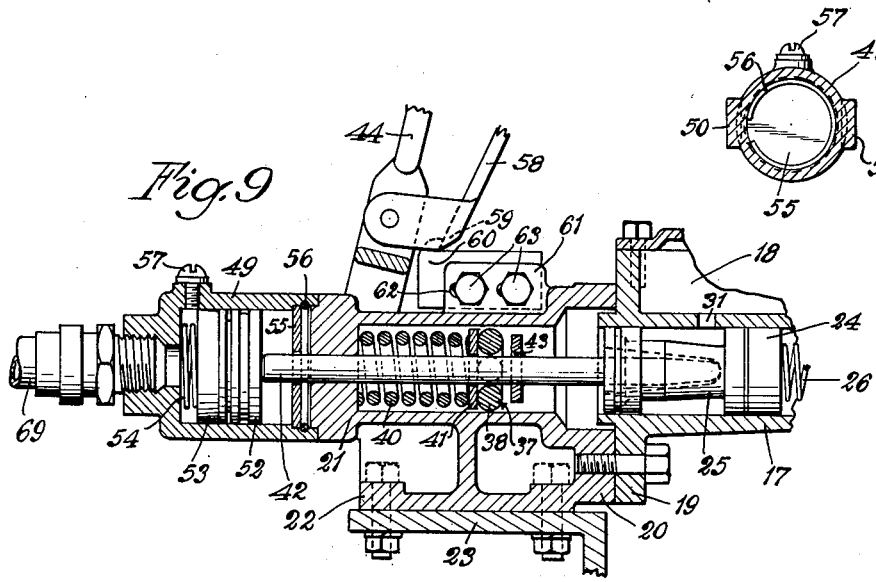
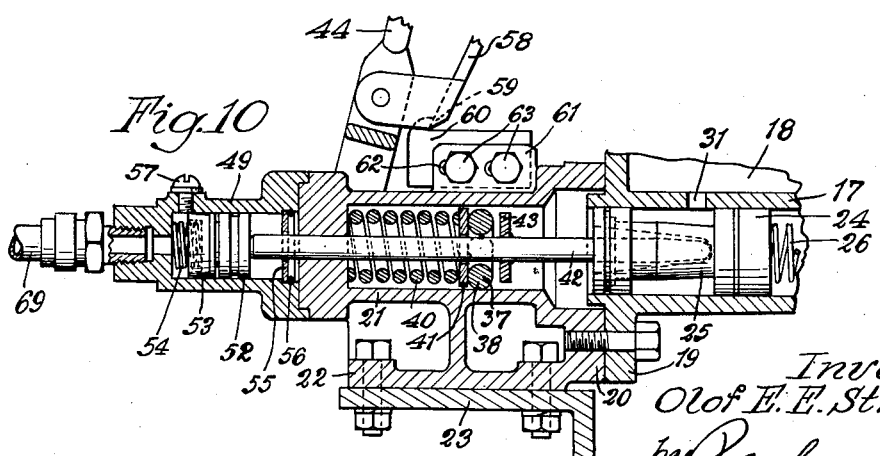
Inventor
Olof E. E. Stromberg
by Parker & Carter
Attorneys.

Patented Nov. 7, 1944

2,362,324

UNITED STATES PATENT OFFICE 2,362,324

BRAKE FOR TRAILERS AND THE LIKE

Olof E. E. Stromberg, Chicago, Ill.

Application November 12, 1942, Serial No. 465,300

8 Claims. (Cl. 188—3)

My invention relates to improvements in brakes for trailers and the like and while for the sake of convenience, it is illustrated as applied to the type of brake normally used on a house car trailer towed by a passenger automobile, it will be evident that this type of brake might be used in connection with any tractor trailer combination or even between a pair of trailers, and while illustrated in connection with hydraulic brakes, my invention might under certain circumstances be equally well applied to vacuum or air or electric brakes.

One object of my invention is to provide on an automobile or tractor and on a trailer, two separate hydraulic or other braking systems which may be connected and disconnected at will without interfering with the operation of either and wherein the hydraulic or fluid supply and control in each system is separate, there being a connection between the systems such that the manipulation of the service brake on the passenger vehicle or tractor will automatically cause the operation of the brakes on the trailer.

Another object of the invention is to provide automatic means whereby the two systems will be disconnected in the event of an inadvertent severing of the towing connection between the vehicles without interfering with the operation of either system, and whereby such connection will automatically apply the brakes on the trailer.

Other objects of my invention will appear from time to time throughout the specification and claims.

My invention is illustrated more or less diagrammatically in the accompanying drawings, wherein—

Figure 3 is a longitudinal section through the coupling and the master cylinder on the trailer;

Figure 4 is a plan view of the parts shown in Figure 3;

Figure 5 is a side elevation in part section showing the connection uncoupled;

Figure 6 is a section along the line 6—6 of Figure 3;

Figure 7 is a rear elevation of the socket which holds the brake connection on the tractor when the trailer is not used;

Figure 8 is a section along the line 8—8 of Figure 5;

Figure 9 is a part section similar to Figure 3 on an enlarged scale showing a modified form;

Figure 10 is a section similar to Figure 9 showing a further modified form.

Like parts are indicated by like characters throughout the specification and drawings.

Figure 1:
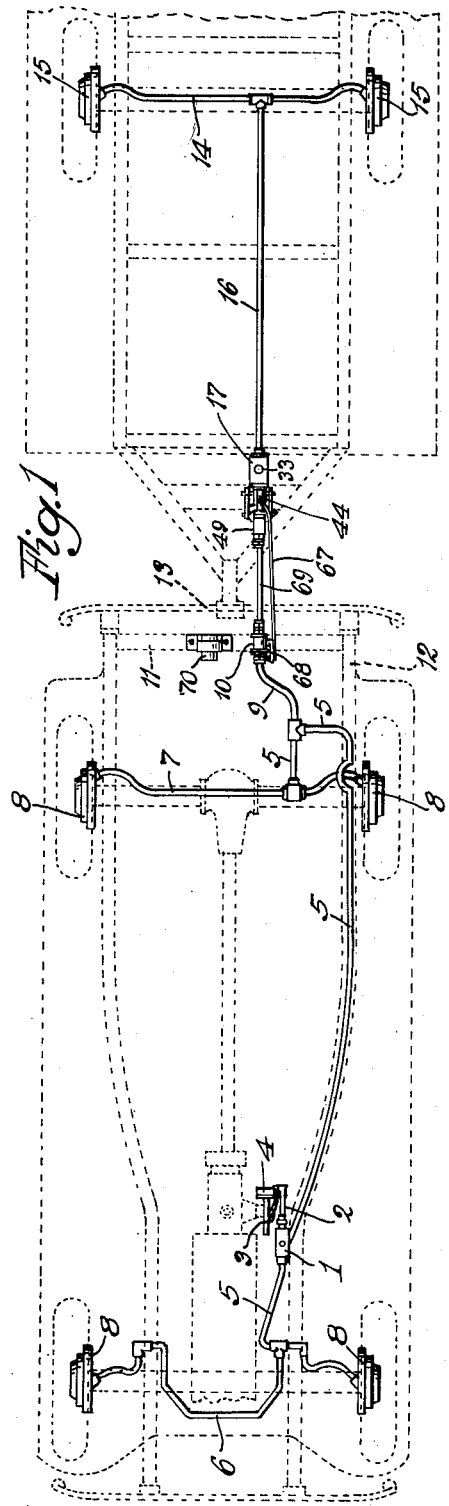
Figure 1 is a layout in plan view of the hydraulic system showing the vehicle and trailer in dotted lines.

1 is a master brake cylinder or driven cylinder having a piston rod 2, and a lever 3, adapted to be rotated to push the piston rod and the piston contained within the master cylinder forwardly in response to pressure on the brake lever 4 to generate pressure to apply the brakes. 5 is a hydraulic pipe connecting the master cylinder 1 with the front wheel hydraulic pipe 6, and the rear wheel hydraulic pipe 7. The pipes 6 and 7 connect to the usual type of actuating pistons not shown associated with brake drums 8 on front and rear wheels. This is the usual type of hydraulic transmission in automobiles on the road today. 9 is a trailer brake pipe extending from the pipe 5, rearwardly to a valve 10 mounted on the rear automobile cross member 11, supported on the rear ends of the frame 12.

13 is a trailer hitch support mounted on the rear ends of the frame members 12 and adapted to support a trailer hitch of any suitable type. 14 is a pipe associated with brake cylinders not shown in brake drums 15, on the trailer wheels. The pipe 14 is connected by a pipe 16 to trailer master cylinder 17. Associated with the trailer master cylinder 17 is an oil reservoir 18, flanged at 19 and bolted to a flange 20 on a connection sleeve 21 which has a foot 22 bolted to a flange 23 on the trailer frame.

24 is a trailer master brake piston mounted to reciprocate in the cylinder 17. 25 is a guide sleeve mounted for reciprocation in the cylinder 17 and carrying piston 24. 26 is a compression spring in the cylinder 17 tending normally to urge the piston 24 toward the left in Figure 3 into the off brake position. Movement of the guide sleeve 25 and piston 24 toward the right will compress the spring 26 and will force hydraulic fluid from the cylinder 17 into the pipe 16, thus applying the brakes on the trailer. This movement of the hydraulic fluid will unseat the plunger valve 27 compressing the safety spring 28 so that the hydraulic fluid may pass through the valve seat 29. If, however, there should be any breakage of the system in the pipe 16, allowing the too rapid escape of hydraulic fluid, the valve plunger 27 will enter the cylindrical seat 30 and prevent waste of hydraulic fluid from the cylinder 17. Normal brake operation will not cause a sufficient movement of the valve plunger 27 to bring this about.

31 and 32 are ports between the reservoir 18, and the cylinder 17, the port 32, being closed as soon as the piston 24 moves toward the right a sufficient distance to apply brake pressure. The two ports insure that the make up supply of hydraulic fluid in the reservoir 18 will enter the system to maintain the system back of the piston 24 always filled with hydraulic fluid. 33 is a filling tube with caps 34, 35 to prevent escape of hydraulic fluid while permitting air to enter.

The connection sleeve 21 is slotted at both sides at 36. A yoke 37 including an annular ring 38 and trunnions 39 is located within the sleeve 21. The yoke may be rotated through an angle of 90 degrees about the trunnions from the position of Figure 6 to permit it to be inserted or withdrawn through the slots 36. 40 is an application spring contained within the sleeve 21, abutting at one end on the closed end of the sleeve, at the other end on a washer 41. 42 is a push pin floating in the yoke and in the apertured integral closure 420 of the sleeve 21. A lock washer 43 fixed in position in the push pin 42 engages the rear face of the yoke ring 38 so that when the spring 40 is free to expand rearwardly it forces the push pin 42 to the rear, forcing the plunger 24 into the brake actuating position but the push pin 42 is never allowed to move so far to the right that it does not project slightly beyond the forward end of the sleeve 21 as indicated in Figure 5.

Pivoted on the forward end of the sleeve 21 is a forked locking lever 44. Each arm of the fork has an outwardly projecting pin 45. Links 46 are pivoted at one end on the pins 45 and at the other end on the trunnions 39 of the yoke. When the parts are in the released position shown in Figure 5, the links 46 permit the push pin 42 to move rearwardly under the pressure of the spring 40 to apply the brakes and that is the position in which the parts are normally found when the trailer and the tractor are disconnected. The links 46 are slotted at 47 to permit a certain amount of link-pin-plunger movement irrespective of the actual position of the forked lever 44 to take up any clearance necessary to these parts.

The forward end of the sleeve 21 is provided with a boss 48 adapted to penetrate into the tractor pipe socket or driving cylinder 49 in order to insure proper alignment of the cylinder 49 and sleeve 21. Ears 50 on both sides of the cylinder 49 are adapted to be engaged by the cam members 51 on the two forks of the lever 44 so that when the lever 44 is in the locking position as shown in Figure 3, the members 49 and 21 are held in alignment and the spring 40 is compressed by movement of the yoke 37 to the left.

Under these circumstances the push pin 42 engages the plunger guide or piston 52 moving the plunger collar 53 to the left and compressing the spring 54. As shown in Figure 3, 55 is a washer held in the socket 49 by the spring ring 56. When the parts are disconnected as shown in Figure 5, the spring 54 holds the plunger against the washer 55 to close the hydraulic system on the tractor. The screw 57 closes an aperture in the socket 49 through which air may be drained if necessary.

The lever 44 is held in the locking position by a latch lever 58 having a latch tooth 59 adapted to engage a latch abutment 60 adjustably mounted on the socket 21 by means of the rib 61, the slots 62 and the holding screws 63 so that the locking position of the lever may be properly adjusted. 64 is a guide pin rigidly mounted on the lever 54 extending through an aperture 65 in the lever 44 and having an eyelet 66 in front of the lever 44 and encircled by the latch spring 640.

Figure 2:
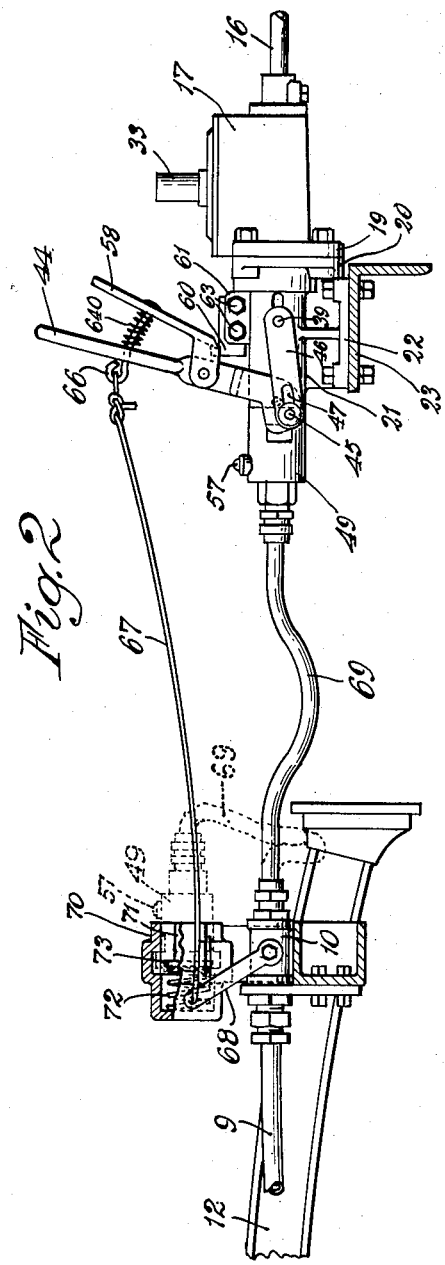
Figure 2 is a side elevation in part section on an enlarged scale showing the coupling between the two vehicles.

When the parts are in the position shown in Figure 2, a breakable cable 67 extends from the eyelet 66 to the lever 68 of the valve 10 on the tractor frame. The cable 67 is shorter than the flexible pipe 69 which extends from the valve 10 to the socket 49 so that if by any chance the trailer hitch should become disconnected, the tension on the cable 67 will release the latch 58, 59, to free the socket 49 from the trailer. Further disconnection will break the cable 67. Meanwhile, the spring 40 will have rotated the latch lever 44 into the position shown in Figure 5, moving the trailer master plunger 24 to the right to apply the brakes on the trailer. The plunger guide 52 will move to the right to the end of its excursion and thus both hydraulic systems remain tight, and independently operative without interference with the vehicle brake system, and the trailer brake will have been applied.

When the tractor is operating without the trailer, the socket 49 is inserted in the fixed socket member 70, the ears 50 engaging the bayonet joint slot 71. The socket 49 is then rotated to compress the spring 72 and plunger 73 to exert a sufficient yielding pressure to hold the ears 50 in the bayonet joint slot and to seal the open end of the socket 49 against dust and moisture while the tractor is operating without a trailer.

Normally the lever on the trailer will be in the position shown in Figure 5 and the brakes will remain applied. However, for hand manipulation of the trailer, the lever may be returned to the position shown in Figure 3 and latched in the free brake off position. In order to apply the trailer brakes again, all that is necessary is to release the latch by hand when the spring 40 will again apply the brakes.

Figures 9 and 10 show a portion of the apparatus of the general character shown in Figure 3, except that in Figure 9, the piston subject to the pressure generated in the master cylinder on the tractor is of larger diameter than the master cylinder piston on the trailer. Whereas in Figure 10, the piston subject to the pressure of the tractor brake system is of smaller diameter than the master piston on the trailer. Thus by changing only the coupling socket associated with the tractor the hydraulic differential between the two systems may be controlled as desired without any change whatever in any other parts of the mechanism. The desirability of this is obvious. A tractor is likely to use a wide range of trailers. Braking conditions with respect to them may differ. This simple, slight change which can be made by any garage mechanic who has a store of spare coupling sockets of different sizes enables a proper adjustment of the relationship between the tractor and the trailer and it will be noted in this connection that both the socket of Figures 9 and 10 and any variation of them, will fit the connection sleeve of Figure 7.

I claim:

1. In a hydraulic brake system for a plurality of vehicles and the like, a master cylinder, and a master piston therein on one vehicle, a power transmission cylinder and a power transmission piston therein on the other vehicle, a connecting sleeve permanently aligned with the master cylinder, means for removably holding the power cylinder in alignment with the sleeve including a forked lever pivoted on the sleeve, lugs projecting laterally from the power transmission cylinder and cam members on the lever adapted to engage the lugs, a latch stop adjustably positioned on the sleeve and a latch dog on the lever in releasable engagement with the stop, the ends of the cylinders adjacent the sleeve being open and masked by the sleeve, the wall of the sleeve being slotted, a yoke in the sleeve having trunnions extending outwardly through the slots, the end of the sleeve nearest the power cylinder having an integral apertured closure, a push pin slidable in and guided by the closure and projecting at both ends beyond the sleeve to engage the pistons, the pin being slidable in the yoke, a spring within the sleeve encircling the pin adapted to be compressed between the yoke and the closure.

2. In a hydraulic brake system for a plurality of vehicles and the like, a master cylinder, and a master piston therein on one vehicle, a power transmission cylinder and a power transmission piston therein on the other vehicle, a connecting sleeve permanently aligned with the master cylinder, means for removably holding the power cylinder in alignment with the sleeve including a forked lever pivoted on the sleeve, lugs projecting laterally from the power transmission cylinder and cam members on the lever adapted to engage the lugs, a latch stop adjustably positioned on the sleeve and a latch dog on the lever in releasable engagement with the stop, the ends of the cylinders adjacent the sleeve being open and masked by the sleeve, the wall of the sleeve being slotted, a yoke in the sleeve having trunnions extending outwardly through the slots, the end of the sleeve nearest the power cylinder having an integral apertured closure, a push pin slidable in and guided by the closure and projecting at both ends beyond the sleeve to engage the pistons, the pin being slidable in the yoke, a spring within the sleeve, encircling the pin, adapted to be compressed between the yoke and the closure, and means rigidly mounted on the pin adapted to engage the side of the yoke opposite to the spring, links pivoted on the trunnions and on the lever so related that movement of the lever to the latched position displaces the yoke and compresses the spring, leaving the pin free to float between the power piston and the master piston.

3. Connecting means for hydraulic power transmission systems including a driving piston and a driven piston, cylinders in which said pistons are mounted for reciprocation, a connecting sleeve in alignment with and permanently associated with one of the cylinders, a lever and means associated therewith for locking the sleeve and the other cylinder together in alignment, a push pin interposed between and engaging both pistons and extending through the sleeve, a spring within the sleeve adapted normally to force the push pin against the driven piston and force it inwardly in its cylinder, means operated by the locking means for compressing the spring to leave the push pin free to float between the two pistons.

4. Connecting means for hydraulic power transmission systems including a driving piston and a driven piston, cylinders in which said pistons are mounted for reciprocation, a connecting sleeve in alignment with and permanently associated with one of the cylinders, a lever and means associated therewith for locking the sleeve and the other cylinder together in alignment, a push pin interposed between and engaging both pistons and extending through the sleeve, a spring within the sleeve adapted normally to force the push pin against the driven piston and force it inwardly in its cylinder, means operated by the locking means for compressing the spring to leave the push pin free to float between the two pistons, said means including a yoke within the sleeve in slidable relation with the push pin, the yoke being adapted to be engaged by the spring and a member rigidly associated with the push pin adapted to be engaged by the side of the yoke opposite to the spring.

5. Connecting means for hydraulic power transmission systems including a driving piston and a driven piston, cylinders in which said pistons are mounted for reciprocation, a connecting sleeve in alignment with and permanently associated with one of the cylinders, a lever and means associated therewith for locking the sleeve and the other cylinder together in alignment, a push pin interposed between and engaging both pistons and extending through the sleeve, a spring within the sleeve adapted normally to force the push pin against the driven piston and force it inwardly in its cylinder, means operated by the locking means for compressing the spring to leave the push pin free to float between the two pistons, said means including a yoke within the sleeve in slidable relation with the push pin, the yoke being adapted to be engaged by the spring and a member rigidly associated with the push pin adapted to be engaged by the side of the yoke opposite to the spring, the sleeve being slotted, trunnions on the yoke extending outwardly through the slots, links interposed between the trunnions and the lever, the relationship between the yoke and the slots being such that when the pin is withdrawn from the sleeve, the yoke may be rotated through an angle of 180 degrees about the axis of the trunnion and be laterally withdrawn through the slots.

6. Connecting means for hydraulic power transmission including a cylinder, a driven piston freely floating therein, a flange extending laterally therefrom adjacent the end thereof, a connection sleeve permanently attached to the flange in alignment with the cylinder, the sleeve being enlarged adjacent the flange to form a pocket, to enclose the projecting end of the cylinder and having an integral apertured closure at its other end, the closure having on its outer face a cylindrical boss of less outside diameter than the sleeve, a pair of diametrically opposed longitudinal slots in the wall of the sleeve, a yoke within the sleeve having a central aperture concentric with the sleeve and trunnions extending outwardly through the slots, a power cylinder adapted to abut on the end of the sleeve and to be penetrated by the boss to align the sleeve and the cylinder, a driving piston freely floating in the power cylinder, a push pin floating in the apertures in the closure and the yoke and engaging one of the pistons at each end, a forked lever pivoted on the sleeve, ears projecting outwardly from the power cylinder, there being cam surfaces on the lever adapted to engage the ears and hold the power cylinder firmly against the end of the connecting sleeve, links interposed between the lever and the trunnions, a spring in the sleeve encircling the push pin abutting at one end on the inside wall of the closure, at the other end on the yoke, adapted to be compressed between the yoke and the end closure of the sleeve when the lever is in locking position to 7. Connecting means for hydraulic power transmissions including a cylinder, a driven piston freely floating therein, a flange extending laterally therefrom adjacent the end thereof, a connection sleeve permanently attached to the flange in alignment with the cylinder, the sleeve being enlarged adjacent the flange to form a pocket to enclose the projecting end of the cylinder and having an integral apertured closure at its other end, the closure having on its outer face a cylindrical boss of less outside diameter than the sleeve, a pair of diametrically opposed longitudinal slots in the wall of the sleeve, a yoke within the sleeve having a central aperture concentric with the sleeve and trunnions extending outwardly through the slots, a power cylinder adapted to abut on the end of the sleeve and to be penetrated by the boss to align the sleeve and the cylinder, a driving piston freely floating in the power cylinder, a push pin floating in the apertures in the closure and the yoke and engaging one of the pistons at each end, a forked lever pivoted on the sleeve, ears projecting outwardly from the power cylinder, there being cam surfaces on the lever adapted to engage the ears on the power cylinder, and a latch mechanism interposed between the lever and the sleeve to hold the lever in the locking position.

8. Connecting means for hydraulic power transmissions including a cylinder, a driven piston freely floating therein, a flange extending laterally therefrom adjacent the end thereof, a connection sleeve permanently attached to the flange in alignment with the cylinder, the sleeve being enlarged adjacent the flange to form a pocket to enclose the projecting end of the cylinder and having an integral apertured closure at its other end, the closure having on its outer face a cylindrical boss of less outside diameter than the sleeve, a pair of diametrically opposed longitudinal slots in the wall of the sleeve, a yoke within the sleeve having a central aperture concentric with the sleeve and trunnions extending outwardly through the slots, a power cylinder adapted to abut on the end of the sleeve and to be penetrated by the boss to align the sleeve and the cylinder, a driving piston freely floating in the power cylinder, a push pin floating in the apertures in the closure and the yoke and engaging one of the pistons at each end.

OLOF E. E. STROMBERG.